United States Patent [19]

Hansen et al.

[11] Patent Number: 5,107,532

[45] Date of Patent: * Apr. 21, 1992

[54] AUTOMATED DOCUMENTATION SYSTEM FOR A COMMUNICATIONS NETWORK

[75] Inventors: John G. Hansen, Forestdale; Ronald I. Forth, Sandwich, both of Mass.

[73] Assignee: Cable Management International, Inc., Sandwich, Mass.

[ * ] Notice: The portion of the term of this patent subsequent to Aug. 28, 2007 has been disclaimed.

[21] Appl. No.: 572,238

[22] Filed: Aug. 23, 1990

Related U.S. Application Data

[63] Continuation-in-part of Ser. No. 410,975, Sep. 22, 1989, Pat. No. 4,953,194.

[51] Int. Cl.$^5$ .......................... H04M 3/22; H04B 3/46
[52] U.S. Cl. ........................................ 379/25; 324/66
[58] Field of Search .................. 379/25, 29, 106, 350; 324/66

[56] References Cited

U.S. PATENT DOCUMENTS 4,208,553  6/1980  Kaplan ................... 379/25

OTHER PUBLICATIONS

Communications Week; Mar. 20, 1989; p. 3, Anixter, The BIX Cross-Connect System.
Ross Smith, Mike Lumpkin; Troubleshooting LANs for Improved Uptime: TPT/Networking Management; Feb., 1989; pp. 44–50.

*Primary Examiner*—Stafford D. Schreyer
*Attorney, Agent, or Firm*—Fish & Richardson

[57] ABSTRACT

A system for tracing a conductor connected between a terminal of one terminal block and a terminal of another terminal block within a network of conductors and terminal blocks includes a supervisor associated with each terminal block for imposing a trace signal selectively on any of the terminals of said block. The supervisor also detecting a trace signal appearing on any of said terminals. A controller communicates with the supervisors to cause a selected supervisor to impose a trace signal on one of the terminals of its associated terminal block, and receives from the supervisors a report of another terminal at which the trace signal appears.

46 Claims, 8 Drawing Sheets

| 0 | 6 | 7 | 13 | 14 | 17 | 18 | 23 |
|---|---|---|---|---|---|---|---|
| Building Address | | Floor Address | | Closet Address | | Commands | |

| 24 | 30 | 31 | 36 | 37 | 44 | 45 | 47 |
|---|---|---|---|---|---|---|---|
| Block Address | | Wire Pair Address | | Message Number | | Commands | |

FIG. 9

| 0 | 6 | 7 | 12 | 13 | 20 | 21 | 23 |
|---|---|---|---|---|---|---|---|
| Block Address | | Wire Pair Address | | Message Number | | Commands | |

FIG. 10

| 0 | 6 | 7 | 12 | 13 | 20 | 21 | 23 |
|---|---|---|---|---|---|---|---|
| Block Address | | Wire Pair Address | | Message Number | | Status | |

AUTOMATED DOCUMENTATION SYSTEM FOR A COMMUNICATIONS NETWORK

This is a continuation-in-part of copending U.S. application Ser. No. 07/410,975, filed Sept. 22, 1989, U.S. Pat. No. 4,953,194.

BACKGROUND OF THE INVENTION

This invention relates to developing documentation of wiring among users in a distributed communications network, such as telecommunication network in one or more buildings.

Referring to FIG. 1, typically all incoming telephone cables that service subscribers in a building 12 enter the building through a common entrance 14 (e.g., where lightning and electrical protection may also be provided). These incoming cables 10, which include hundreds of individual telephone wires, terminate at and are connected to telephone switching equipment in a main equipment room 16. The output of the telephone switching equipment is itself terminated, using so called "punch down" or wiring blocks (not shown), on a Main Distribution Frame ("MDF"). The MDF is the central location at which all configuration control is accomplished.

In a multifloor building, vertical riser system 18 serves as the medium for the routing of cables from the building entrance 14 and the equipment room 16 to each floor 17 within the building distribution system. Each floor includes a riser wiring closet 20 which serves as a termination point for the vertical riser cable. The cable is terminated on so-called "sub-distribution frames" (which provide accessible points for test, trouble-shooting, and system expansion) and cross connected to the horizontal distribution cables servicing the floor. Trunk cable pairs from these sub-distribution frames are cross-connected to the system equipment that appears on the MDF. Office drops (i.e., a single channel attachment point) are routed to a sub-distribution frame for cross connection to this trunk cabling.

For installations serving a large floor area, one or more "satellite closets" 24 can be placed on a floor to supplement the riser closet or equipment room. This remote installation decreases the amount of cable required to provide service to the floor. The riser and satellite closets typically house the same equipment. The horizontal distribution system delivers the circuit interfaces from the riser closet, satellite closet or equipment room, via punch down block cross connections, to drop locations for the subscriber's telephones or terminals. This completes building information system 26.

The punch down blocks are terminal blocks that allow for cable terminations and cross connections from one cable to another within the building distribution system. These devices facilitate moving, changing and deleting wire interfaces (e.g., as subscribers move to different locations, or as new subscribers are added).

In order to permit reliable, accurate telephone service to the subscriber, documentation as to the sources and destinations of each and every telephone wire throughout the network should be maintained. Given the large number of individual wires and the multiplicity of individual wires, documentation is a difficult task. Maintaining up to date wiring documentation is made more difficult when (as often occurs) those who service the network and move, change or delete wire interfaces at punch down blocks fail to accurately or promptly document their changes.

SUMMARY OF THE INVENTION

One general aspect of the invention is tracing a conductor connected between a terminal of one terminal block and a terminal of another terminal block within a network of conductors and terminal blocks, using a supervisor associated with each terminal block for imposing a trace signal selectively on any of the terminals of the block and for detecting a trace signal appearing on any of the terminals; a controller communicates with the supervisors and causes a selected supervisor to impose a trace signal on one of the terminals of its associated terminal block, and the controller receives from the supervisors a report of another terminal at which the trace signal appears.

Another general aspect of the invention is the supervisor itself. The supervisor includes a network connection port for connection to the terminals of a terminal block and control circuitry for receiving from a communication port a command that identifies a terminal of the network; the control circuitry imposes the trace signal on the identified terminal, identifies a terminal at which the trace signal appears, and sends a report of the identity of the terminal via the communication port.

Preferred embodiments include the following features.

The terminal block (which is, e.g., a 66M punch down block) and its associated supervisor are mounted adjacent one another on a supporting member (e.g., a wall of a wiring closet) using a bracket that supports the terminal block and serves as a cage for protecting the supervisor. The supervisor is disposed in a housing. The bracket includes spacers that position the terminal block a predetermined distance from the wall to allow the supervisor to be disposed therebetween. The bracket also includes clips for holding the terminal block against the supports allowing the block to be easily removed for service or replacement.

Electrical connections between at least some of the conductors of the network (which is, e.g., a telephone system for transmission of voice and data messages between subscribers via the conductors), the supervisor, and the terminal block are modular. This allows either the terminal block, the supervisor, or both to be removed for repair or replacement without disturbing the connections to the individual terminals of the block.

In one embodiment, the modular connection is achieved with a pair of connectors, one of which receives conductors from the network; the other connector receives connections from the terminals of the terminal block. The individual pins of the connectors are interconnected to provide one-to-one connectivity between the network conductors and the terminals of the block. The two connectors are preferably mechanically incompatible (e.g., male and female, respectively) so that connections to the terminal block and to the network are not easily reversed.

During operation, the controller broadcasts to the supervisors an inquiry that identifies one of the conductors in the network. Each supervisor determines whether a terminal of its terminal block is connected to the conductor and, if so, the supervisor imposes the trace signal on that terminal. Each supervisor also monitors the terminals of its terminal block for appearance of the trace signal. The supervisors each identifies the terminals of their terminal blocks at which the trace signal appears and designates each such terminal in its report.

A processor causes the controller to initiate the inquiry and responds to the reports by generating a list of all terminals that are interconnected to the conductor identified in the inquiry; the list is stored in a data base for easy access.

The invention provides an automated system for documenting wiring and for producing an accurate wiring list for the network. The wire list data base is built automatically upon request from the processor. Partial documentation is also possible to verify a limited update or repair to the system. Documentation may be performed concurrently with activity on the system. As such, all or part of the system does not need to be shut down to "buzz out" the wiring. The supervisor enhances system trouble-shooting and can generate work orders for moves, additions, and deletions of the building wiring. Visual indicators on individual supervisors are used to direct the technician to the correct locations to help minimize system repair time. The supervisors are hardware compatible with the most popular existing system hardware (66M-type connecting blocks) thus minimizing system installation problems and cost. Finally, a user-friendly user interface with command prompting simplifies operation of an otherwise complex system.

Other features and advantages of the invention may become apparent from the following detailed description, and from the claims.

DESCRIPTION OF THE PREFERRED EMBODIMENT

We first briefly describe the drawings.

Figure 1:
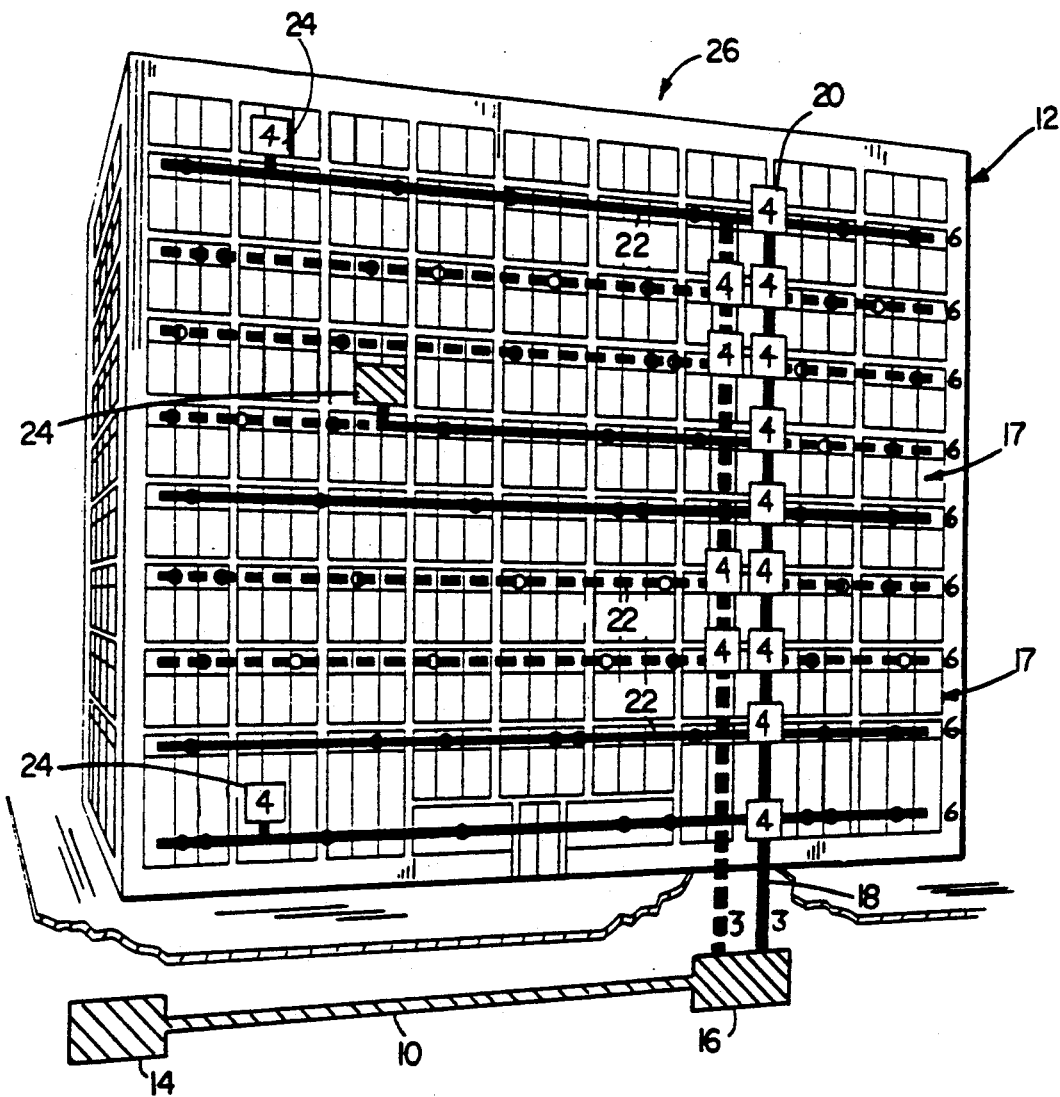
FIG. 1 is a diagram of a building containing a communications network.
Figure 7:
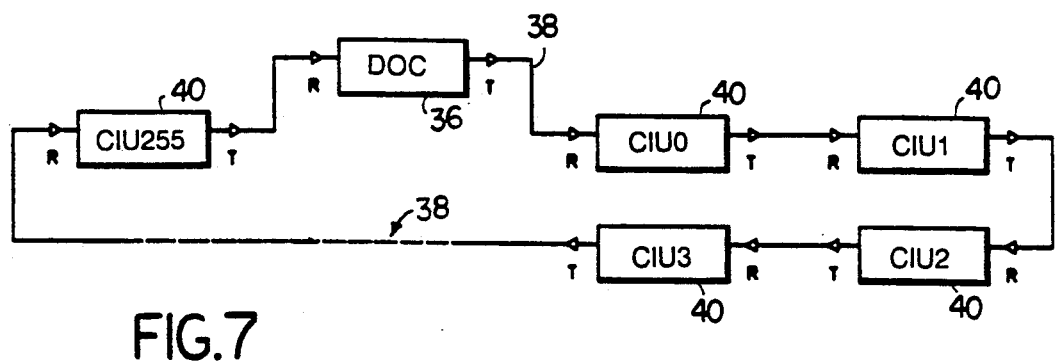

FIG. 7 shown the primary LAN of FIG. 1.

Figure 8:
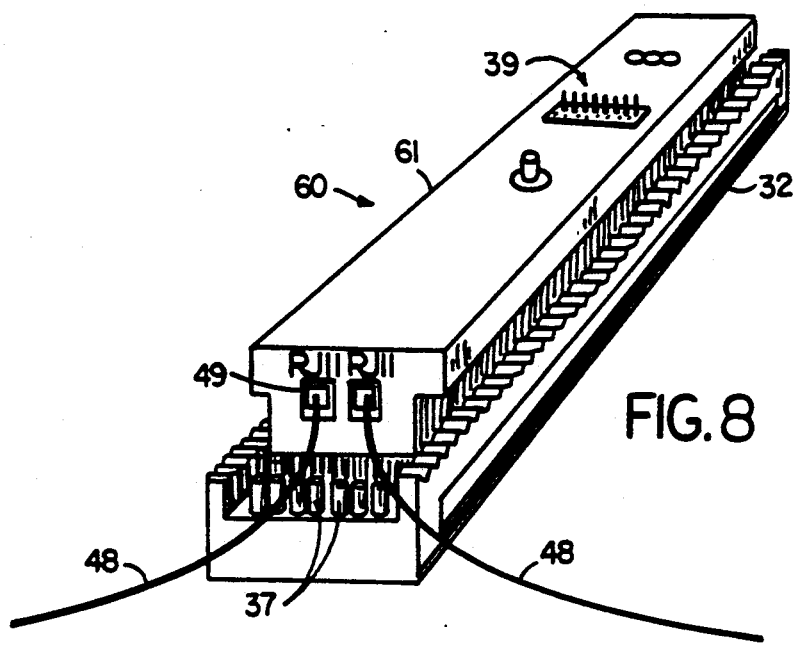

FIG. 8 illustrates an embodiment of the supervisor of the invention attached to a punch down block;

FIG. 9-12 are diagrams demonstrating an addressing scheme according to the invention.

Figure 13:
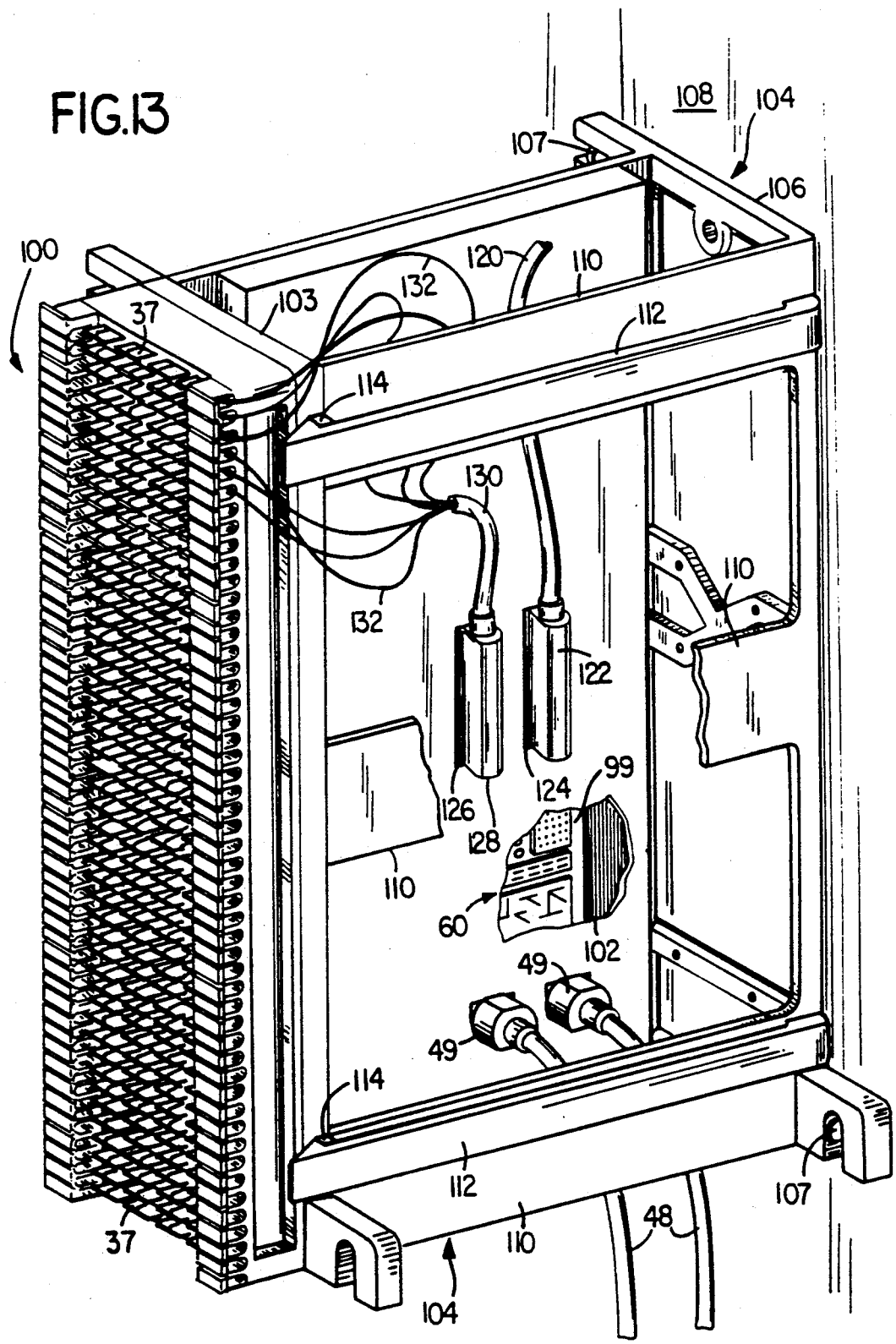

FIG. 13 shows the punch down block and supervisor mounted together within a wall frame.

STRUCTURE AND OPERATION

System Overview

Figure 2:
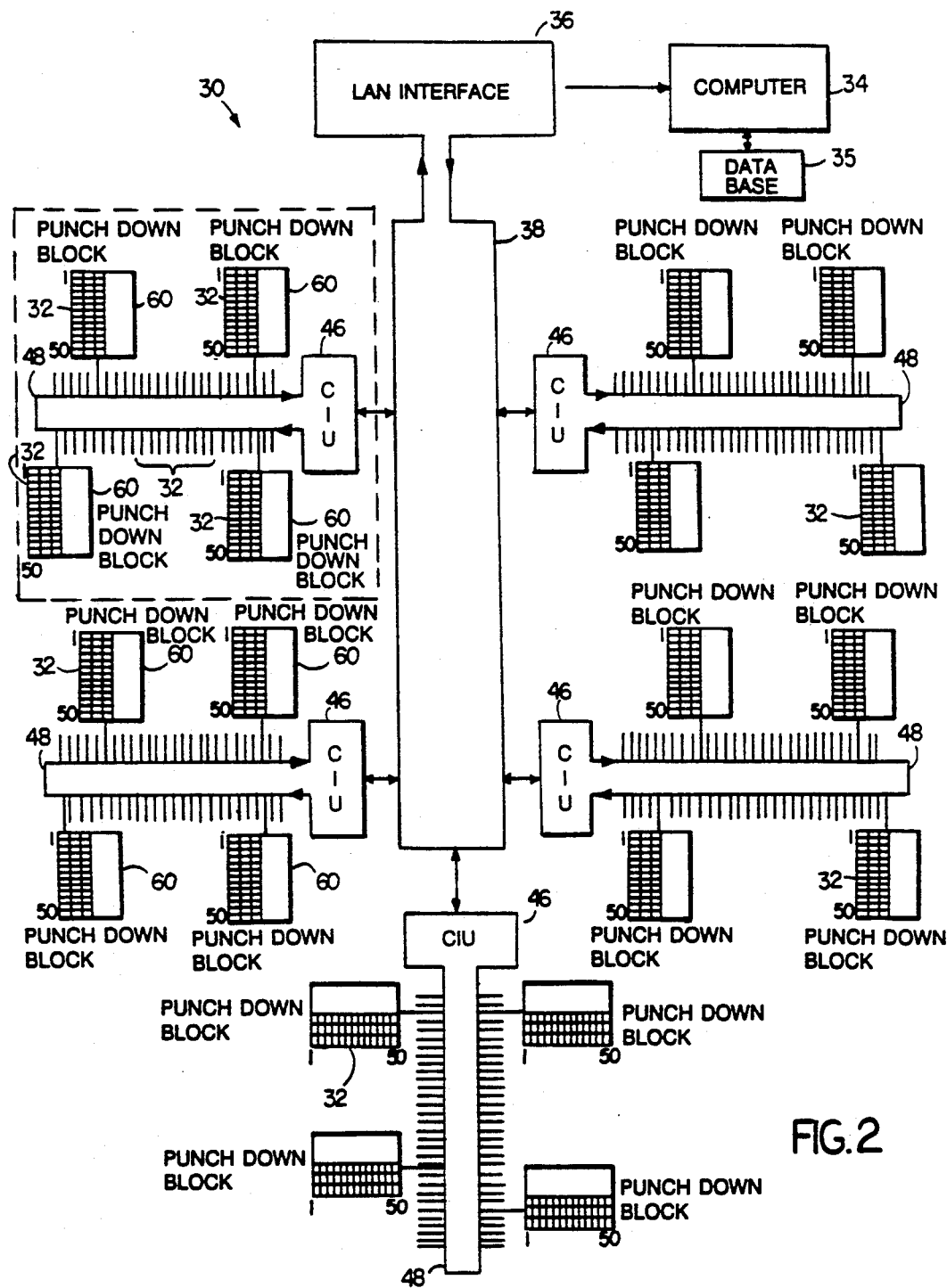
FIG. 2 is a block diagram of the automated documentation system of the invention.

Referring to FIGS. 1 and 2 automated system 30 assists in the management of the hardware aspect of building information system 26 by simplifying the task of maintaining a current and accurate wire list of the communications network 26. System 30 allows a wire list data base 39 to be built automatically upon request from a system operator. Partial documentation is also possible to verify a limited update or repair to network 26. Documentation operation may be effected concurrently with activity on communications system 26. All or part of network 26 does not need to be shut down to 'buzz-out' the wiring. Trouble-shooting is enhanced and work orders for moves, additions, and deletions of the building wiring in network 12 can easily be generated. Visual indicators on the supervisors 60 of the individual punch down blocks 32 in closets 20, 24 are used to direct the technicians to the correct locations to help minimize network repair time. The hardware in system 30 (described below) is hardware compatible with the most popular existing system hardware (e.g., 66M type connecting punch down blocks 32) thus minimizing system installation problems and cost. A user-friendly user interface with command prompting simplifies operation of an otherwise complex system.

System Operation

System 30 includes a computer 34 that is equipped with a keyboard and a color video display terminal to provide the primary user interface. Computer 34 controls the operation of system 30 in a manner described in detail below.

Figure 3:
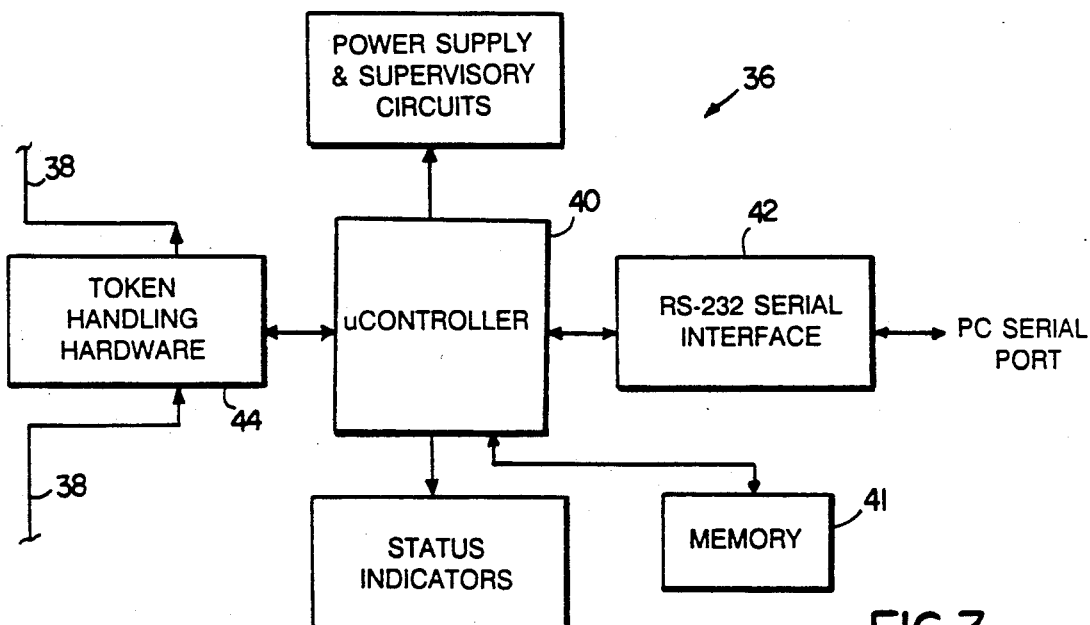
FIG. 3 is a block diagram of the LAN interface of the system of FIG. 1.

Referring also to FIG. 3, primary LAN (local area network) interface 36 provides the connection between the RS 232 port of computer 34 and a system-wide local area network 38 that serves every closet 20, 24 and every punch down block in communications system 26. The connection between computer 34 and interface may be direct or via modem. LAN interface 36 is an 'intelligent' device which includes a controller 40 to accept commands from computer 34 (via RS 232 serial interface 42) and handles the hardware and LAN protocol translation via token handling hardware 44. Interface 36 handles such time intensive operations as error checking, token handling, etc., and thus maximizes system through-put by allowing computer 34 to process its data base 35 concurrently with the network activity. This function may be realized as either an external accessory to computer 34 (similar to an external modem, etc.) or as a plug-in board. There may be only one such device in system 30, although one computer 34 may support more than one system 30. Self test diagnostics are included in the controller firmware of interface 36 to enhance reliability.

All major commands for system 10 are issued over primary LAN 38 by LAN interface 36, and only one LAN interface 36 is present in LAN 38.

Figure 4:
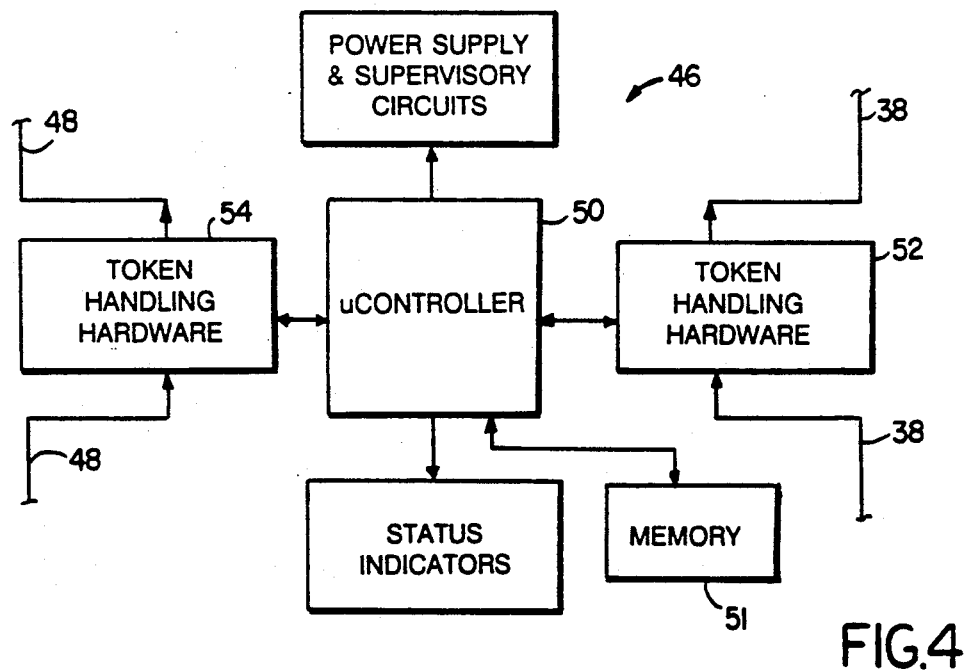
FIG. 4 is a block diagram of the CIU interface of the system of FIG. 1.

Referring also to FIG. 4, closet interface units (CIUs) 46 located in every closet 20, 24 provide the connections between primary LAN 38 and secondary LANs 48 located in each closet 20, 24. CIU 46 is an 'intelligent' device which includes a microcontroller 50 that provides the interface between the primary and secondary system LANs 38, 42 via token handling hardware 52, 54, respectively. This component has been introduced into the system to enhance system performance and to optimize system installation. The CIUs 46 serve both as the LAN control device in a wiring closet 20, 24 and also as the source of conditioned power to the individual intelligent punch down blocks 32 (described below) associated with it. Self test diagnostics are included in the controller firmware of each CIU 46 to enhance reliability.

Each punch down block 32 in communications network 26 and accessed by system 30 includes a supervisor 60 that includes circuitry that makes the punch down block 32 "intelligent" as well. Supervisor 60 may be either integral with punch down block 32 or attached to it as an add-on unit. Each punch down block 32 (IPDB) makes the physical connections to individual wires of communication system 26 to be documented.

Each punch down block 32 is, e.g., a "66M" block which can receive and make cross connections for, e.g., 50 individual pairs of wires. Supervisors 60 serve as the electronic counterpart of the manual use of test equipment to 'buzz-out' the building wiring system.

Figure 5:
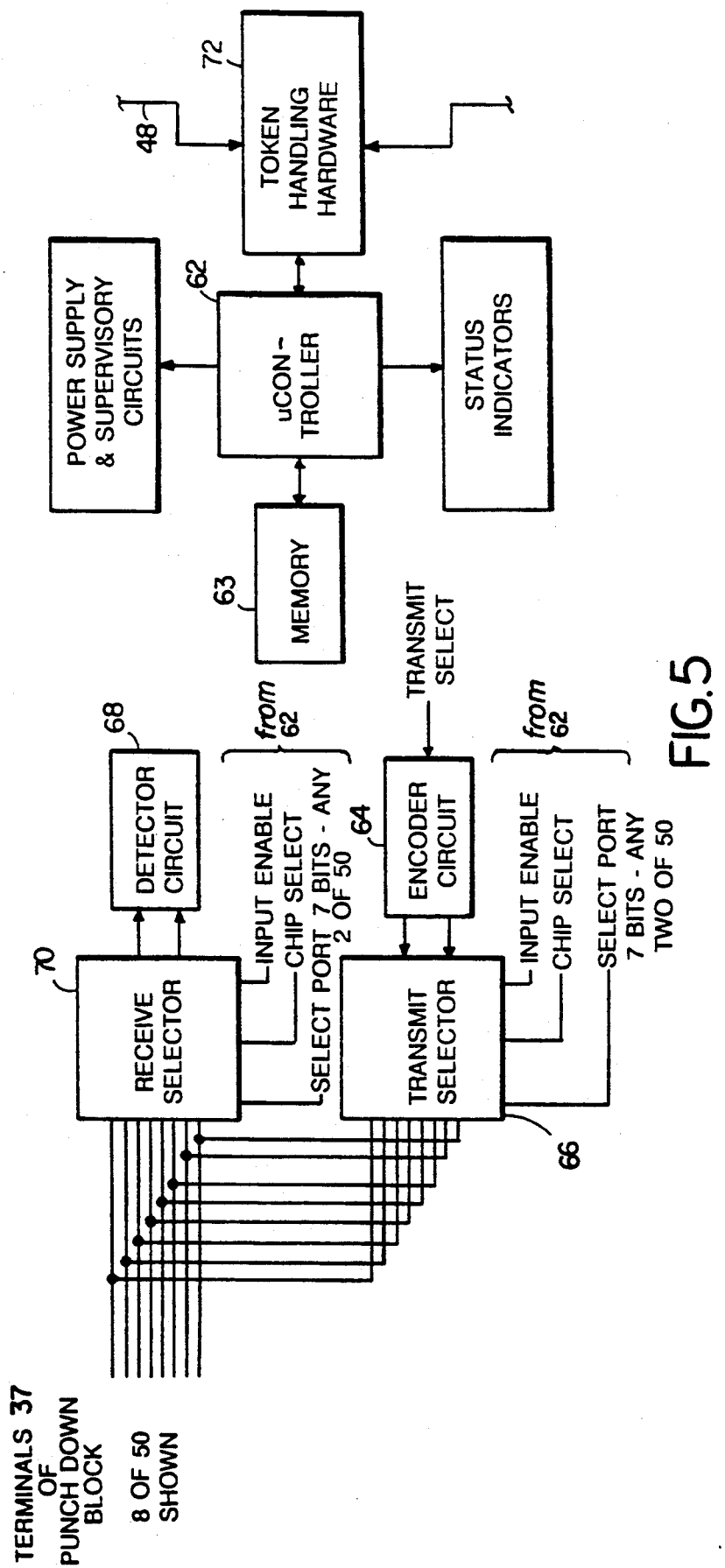
FIG. 5 is a block diagram of the supervisor of the system of FIG. 1.

Referring also to FIG. 5, each "intelligent" punch down block 32, using supervisor 60, is capable of: providing a test signal to any wire pair on the punch down block to which it is connected (using micro-controller 62, encoder 64, and transmit selector 66); detecting the presence of this signal on any wire pair (with detector circuit 68 and receive selector 70); and reporting this data to the associated CIU 46. Supervisor 60 communicates with CIU 46 via secondary LAN 48 and token handling hardware 72. Self test diagnostics are included in the controller 62 firmware to enhance supervisor reliability.

Control commands are issued to supervisor 60 of each punch down block 32 over secondary LAN 48, which contains only one CIU 46. All messages on LAN 48 pass through CIU 46.

Referring to FIG. 8, a "snap-on" type supervisor 60, embodied in a housing 61, is shown attached to a 66M punch down block 32. Supervisor housing 61 includes electronically conductive sockets (not shown) that are arranged to correspond to the individual terminals 37 on punch down block 32. This allows supervisor 60 to access and monitor every terminal 37. The cable for secondary LAN 48 is 24AWG twisted pair wire, and is connected to housing 61 using a pair of RJ-11 interfaces 49.

The operation will now briefly be described for the documentation (i.e., the generation of a "to-from" wire list) of a single wire pair. Computer 34 requests documentation of a wire pair by issuing a command for test (i.e., an inquiry) signal at any selected wire pair. Each wire pair accessed by the system 30 is identified by a unique address which is a composite of preassigned addresses of the CIU 46, the punch down block supervisor 60 to which the selected wire pair is connected, and the number of the wire pair on the block (e.g., 1–50).

LAN interface 36 processes the inquiry and places this message on primary LAN 38. The message travels (i.e., circulates) on LAN 38 until it reaches the CIU identified in the message. That CIU 46 processes the message and places it on its secondary LAN 48, and the message travels on secondary LAN 48 until it reaches the punch down block 32 identified by its address in the message. The controller 62 in supervisor 60 of that punch down block places the test signal (included in the message) on the selected wire pair of the punch down block 32.

The test signal is the broadcast from that wire pair over communications network 26, any may thus be received by one or more other wire pairs on other punch down blocks 32 (or the same punch down block). The supervisors 60 of all punch down block receiving this test signal place a message containing the wire pair and block addresses on their associated secondary LANs 48. The CIUs 46 collect the messages from their LANs 48. After waiting for a predetermined test latency period, LAN interface 36 broadcasts a global command on primary LAN 38 to instruct all CIUs 46 that have messages from supervisors 60 to pass this information onto primary LAN 38 to report back.

LAN interface 36 receives the information in the form of multiple messages from the multiple CIUs 46 and reports back and the result to computer 34. This message may also include status information from supervisors 60 such as test time out, multiple addresses found, and power failure reported. It may thus be appreciated that no involvement of computer 34 is required between the request for information and the reply from LAN interface 36. When computer 34 receives the reply, the "buzz-out" for that wire pair is deemed completed. Computer 34 adds the to/from information associated with that wire pair to wire list data base 35 and proceeds to select the next wire pair to document.

Both primary LAN 38 and secondary LAN 40 use the same interface hardware, because the media and the data on both loops is similar. The data is transmitted over twisted pair media and the interfaces are compatible with RS-422/485 standards, which are suitable for the operating environment. The characteristics of the data transmission scheme are chosen to optimize reliability and simplicity. Baseband differential Manchester encoding is useful, as it is self-clocking, and is tolerant of polarity inversions. The bit rate of the data is chosen to best compromise the trade-offs between data reliability and data rate.

The system power supplies (in LAN interface 36, CIUs 46, and supervisors 60) are chosen to simplify installation and associated costs while preserving maximum reliability. The design parameters for the system include protection against induced transients, improper wiring, and short circuiting.

The source of power selected for LAN interface 36 is a UL approved external power supply module which plugs into a standard 110 VAC outlet. The power requirements for this module are sufficiently low to allow this choice, and it simplifies approvals by such agencies as UL, CSA, and VDE. The power supply need not be uninterruptable in the event of power failure. If the system manager desires such operation, this power supply can be connected from the same UPS as used for the computer 34 to which the LAN interface 36 is connected.

CIUs 46 are powered from the AC power source available in the telephone closet 24, which also provides conditioned power to the supervisor's 60 connected to it. This power supply may be incorporated into the CIU housing, or may be a separate unit. It need not provide uninterruptable service in the event of power failure. If the system manager desires such operation, this power supply can be connected to a UPS installed in the telephone closet 24.

Supervisors 60 incorporate the necessary local AC -to - DC regulation required to enable proper operation. The operation of supervisors 60 in the event of an AC power failure depends on the CIU power supply condition.

In addition, the software executed by computer 34 is tolerant of power interruptions. To accomplish this performance, the messages are retrieved during a documentation sequence and a progress flag is continuously spooled to a backup disk to allow the documentation process to resume at the appropriate point in the sequence when the power supply is restored.

Referring to FIG. 5, controller 62 and encoder 64 in supervisor 60 generate a test signal and place that signal on the selected wire pair using selector 66 (under the control of micro-controller 62). The source impedance of the line drivers used to drive the wire pairs should be high to permit concurrent operation of the test signal and data or voice transmission on the wire pair. One choice is to use push-pull bipolar or FET devices. Encoder 64 encodes the test signal by either simultaneous or dual tone methods. This improves the immunity of the signals to noise and interference by concurrent data on the wire pairs. A properly chosen encoding scheme also minimizes the effects of reflection (mode breaking) and other anomalies associated with the twisted pair medium. The operating frequency of the test signal is chosen to maximize test through-put while minimizing the media effects as discussed above. The amplitude of the test signal is kept as low as possible to minimize corruption of the concurrent data/voice signals on the wire pairs. This, of course, puts the burden of reliable operation on the receiver/decoder circuitry 68 and the modulation scheme chosen.

Transmit selector circuitry 66 in supervisor 60 scans all wire pairs on the block 32, and detector circuitry 68 decodes the signals to determine reliably the presence or absence of the test signal. The source impedance of the receiver circuitry coupled to the twisted pair wires is relatively high to permit concurrent operation of the receiver and data or voice transmission on the wire pair. This is achieved, e.g., using high input impedance differential amplifiers and a low loading multiplexer circuit. Detector circuitry 60 decodes the complex test signal in as few cycles as possible to maximize system throughput. To keep system cost to a minimum, detector 68 incorporates a single frequency and modulation selective circuit which is multiplexed between the wire pairs. An amplitude sensitive circuit may also be employed to test for the presence or absence of a wire pair during a test transmission. By measuring the differential and ground referred signal on a terminal pair while it is being driven by the transmitter circuitry, it is possible to ascertain whether one or both terminals are connected to a wire.

LANs 38, 48 follow the basic rules of a token pass network, and, e.g., utilize either the IEEE 802.5 token ring specification or the 802.3 10 MBit/second specification. One important characteristic of this type of network protocol is that access to all nodes in the LAN is assured, and the timing of network messages is deterministic. The data format length varies depending upon the type of command that is being sent. The format is as follows:

| CNTRL | IPDBADD | WPADD | STATUS | CKSUM |

The IPDBADD, WPADD and STATUS bytes may be omitted dependent on command type, and WPADD may be multiple bytes. | CMD | is a COMMAND byte, which is the first byte which is interrogated as follows:

- 01H XMIT IPDB ADDRESS : request from CIU 46 to supervisor 60 to send its address and modify CMD to PASS IPDB ADDRESS. If supervisor 60 has sent its address this command will be passed back on to network.
- 01H PASS IPDB ADDRESS: Supervisor 60 will pass this message back on to network.
- 02H RESET IPDB: global reset for all supervisors on the network.
- 03H REDUNDANT ADDRESS FLAG: COMMAND to illuminate LED for address change.
- 04H SEND TONE BIT ADDRESS: COMMAND for supervisor to transmit on a single wire pair as address by PDADD and WPADD.
- 05H PASS TONE(S) ADDRESS(ES): COMMAND to pass this message back on to network.

| IPDBADD | = up to 256 IPDB's.
| WPADD | = up to 50 wire pair locations/per supervisor (can be expanded).
| CKSUM | = checksum/crc of all leading bytes inclusive of control.

Referring to FIG. 2, in all secondary LANs 48, upon power up, all supervisors 60 reset and listen on LAN 48 for an address initialization command (XMIT IPDB ADDRESS) from their CIU's 46. This message is passed to the first CIU where it is modified to a PASS IPDB CIU to be processed as a legitimate supervisor address. The CIU 46 then transmits another XMIT IPDB ADDRESS message on the LAN 48. This message is now passed through the first supervisor 60 because it knows it has just sent its address. The second IPDB receives the command and converts it to a PASS IPDB ADDRESS command and sends it back to the CIU. This process continues until all IPDB ADDRESSES are received.

This scheme locates the total number of supervisors that are on secondary LAN 48, and detects REDUNDANT ADDRESS. The total number of supervisors 60 is the parameter IPDBADD. The format for address initialization will be as follows:

FORMAT:
| CNTRL | STATUS | CKSUM |
    01                "
    02                "

STATUS provides information about the supervisor conditions, such as RESET, XMIT A TONE, RECEIVED A TONE, ADDRESS DIP SW setting modified, etc. In the event of ADDRESS REDUNDANCY, CIU 46 transmits a REDUNDANT ADDRESS FLAG command, and each supervisor with this address illuminates a status indicator LED for address change by its physical DIP SWITCH setting.

Figure 6:
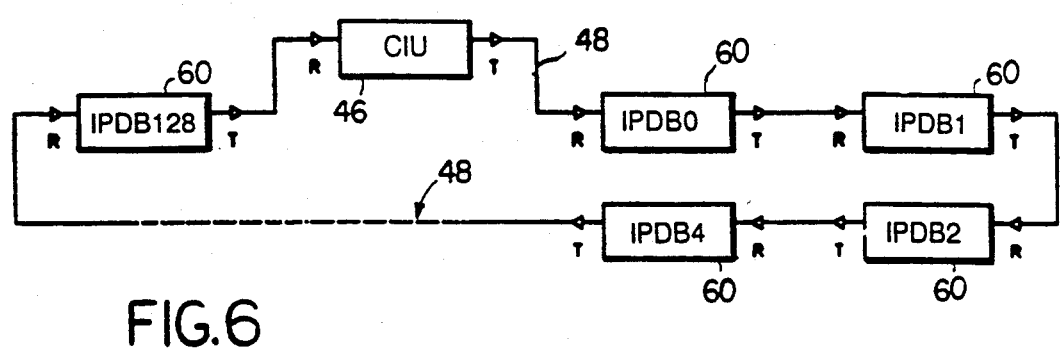
FIG. 6 shows one of the secondary LANS of FIG. 1.

FIG. 6 shows the direction of message transmission from a CIU 46 through its supervisors 60 (e.g., 128 supervisors designated IPDB0-IPDB128) on secondary LAN 48. The format for ADDRESS REDUNDANCY is as follows:

FORMAT:
| CNTRL | IPDBADD | STATUS | CKSUM |
    03   REDUNDANT
         ADDRESS

After all supervisors 60 have been initialized, CIU 46 sends this status information back to LAN interface 36 to be processed by computer 34 to develop the number and status of all wire pairs (i.e., nodes) in the system.

Computer 34 is then ready to document communications system 26. The documentation is performed by initiating all nodes (one at a time) to transmit a test signal and having all receiving nodes report back to computer 34 to establish the SYSTEM DATA BASE. Each identified node will be requested to transmit a tone onto the network. After a predetermined delay time, all supervisors that have received tones will access the network when a token is available and transmit back to computer 34 via the network. The format for transmitting to a node on primary LAN 38 is as follows:

FORMAT:
```
| CNTRL  IPDBADD| WPADD| STATUS | CKSUM |
   04       "        "              "
```

The format for sending back a received tone(s) on the LAN 38 is as follows:

FORMAT:
```
| CNTRL | IPDBADD | WPADD1 | WPADD2 ... WPADD50 | STATUS | CKSUM |
   05        "         "        "            "         "        "
```

Primary LAN 38 follows the same rules as the secondary LAN 48 protocol. The data format length varies depending upon the type of command that is being sent as
FORMAT:
```
| CNTRL | CIUADD | IPDBADD | WPADD
| STATUS | CKSUM |
```
Again, IPDBADD, WPADD, STATUS may be omitted dependent on command type, and WPADD may be multiple bytes.

| CMD | =COMMAND byte is the first byte which is interrogated as follows:
| CIUADD | =up to 256 CIU's, and | IPDB | , | WPADD | , | STATUS | , and | CKSUM | are all the same as for secondary LANs 48.

Referring to FIG. 7, the direction of message flow from LAN interface 36 through CIUs 46 (e.g., 256 CIUs, designated "CIU0"–"CIU255") over primary LAN 38 is shown.

Upon power up, all CIUs 46 reset and listen on the network 38 for an address initialization command (XMIT CIU ADDRESS) from the LAN interface 36. This message is passed to the first CIU where it is modified to pass CIU ADDRESS. This message will be free to travel the complete LAN 38 back to LAN interface 36 to be processed as a legitimate CIU ADDRESS. The LAN interface 36 then transmits another XMIT CIU ADDRESS message on the network. This message is now passed through the first CIU as it knows it has just sent its address, and the second CIU 46 receives the command and converts it to a PASS CIU ADDRESS COMMAND and sends it back to the CIU. This process continues until all CIU ADDRESSES are received.

This scheme locates the total number of CIUs 46 that are on primary LAN 38, and detects REDUNDANT ADDRESS. The total number of CIUs is the parameter CIUADD. The format for the address initialization is as follows:

FORMAT:
```
| CNTRL | STATUS | CKSUM |
   01        "        "
   02                "
```

STATUS provides information about CIU conditions such as RESET, CIU/IPDB STATUS, and ADDRESS DIP SW setting modified.

In the event of ADDRESS REDUNDANCY, the CIU 46 will transmit a REDUNDANT ADDRESS FLAG command, and all CIU's 46 with this address will illuminate a status indicator LED on the device. This will alert the data communication technician to change the device address by changing the physical DIP switch setting. The format for ADDRESS REDUNDANCY is as follows:

FORMAT:
```
| CNTRL |  CIUADD  | STATUS | CKSUM |
   03    REDUNDANT
          ADDRESS
```

After all CIUs have been initialized, computer 34 knows the number of CIUs, the number of supervisors 60, and the total number of nodes (wire pairs) in the system. This information is the foundation for the SYSTEM DATA BASE 35, i.e., to/from charts.

Computer 34 now initiates nodes (i.e., wire pairs) to transmit test signals, and all receiving nodes to report back any reception of this signal to establish the SYSTEM DATA BASE 35. Each identified node will be instructed to initiate a test signal on a particular wire pair and after a pre-determined waiting period, all CIU's that have received tones will place this information on the LAN when a token is available. The format for transmitting a test signal at a wire pair is given as follows:
FORMAT:
```
| CNTRL | CIUADD | IPDBADD | WPADD
| STATUS | CKSUM | The format for sending
```
test signal received information from the CIU 46 back to the LAN interface 36 is as follows:
FORMAT:
```
| CNTRL | CIUADD | WPADD1 | WPADD2 .
.. 50 | STATUS | CKSUM |
```

Referring to FIG. 9, the addressing scheme for message transmissions from LAN interface 36 to a CIU 40 is as follows: seven binary bits (0–6) for building addressing (up to 128 buildings); seven binary bits (7–13) for floor addressing (up to 128 floors); four binary bits (14–17) for quadrant riser closet addressing and the possible additional satellite closets or equipment room (e.g., 16 closets per floor); and six additional bits (18–23) for commands to the Closet Interface Unit. The first twenty-four bits of the word allow each Closet Interface Unit 46 to be addressed by LAN interface 38 and receive commands to execute.

As discussed, each supervisor 60 connects to a 25 or a 50 pair 66M punch down block 36. The addresses for the individual wire locations on the block are hard wired within the block. At present, all premise wiring is done using pairs of wires.

The addressing of each individual block connected to a CIU is done with seven bits (24–30). This allows up to 128 supervisors to be in a secondary LAN 48. Each supervisor housing 61 (FIG. 8) includes seven physically mounted DIP switches 39 to allow the address of the supervisor to be set and changed manually.

Six binary bits (31–36) are used to describe the location of any one wire pair on a 50 pair block. Eight bits (37–44) are allocated for the message number, and the final three bits (45–47) are necessary to issue commands to the supervisor 60.

This second group of twenty four bits (24–47) allow each supervisor and its punch down block to be addressed to its specific wire pair with a message number and the command to execute. As shown in FIGS. 10 and 11, the CIU 46 sends only these last 24 bits (of the 48 bit word that it receives from LAN interface 36)

over the secondary LAN 48. A supervisor that replies to the CIU as discussed above does so by sending a 24 bit word that includes 7 bits of block address (bits 0-6), 6 bits of wire pair address (bits 7-12), 8 bits for the message number (bits 13-20), and 3 bits of status (bits 21-23).

In each closet 24, any individual line is permitted to make contact with a minimum of two punch down blocks 36. A star wired line can make contact with as many as eight wire pairs from one block. Therefore, supervisor 60 and Closet Interface Unit (CIU) 46 have sufficient memory space 63 (FIG. 5) and 51 (FIG. 4), respectively, to store this information which will then be forwarded, via the LAN interface 36, to computer 34.

Overall Operation

When LAN interfaces 36 is instructed by computer 34 to power up, it broadcasts a message to all CIUs 48 and supervisors 60 to power up, send status and listen on all wire pairs.

Computer 12 then selects from 1 up to 256 different wire pairs to broadcast the message number bits it sends to them. When the wire pair on a block has been addressed and commanded to transmit (as discussed above), the message number that has been sent by computer 34 is telemetered onto the wire pair. This signal can co-exist with whatever signal is present on the wire pair.

Figure 12:
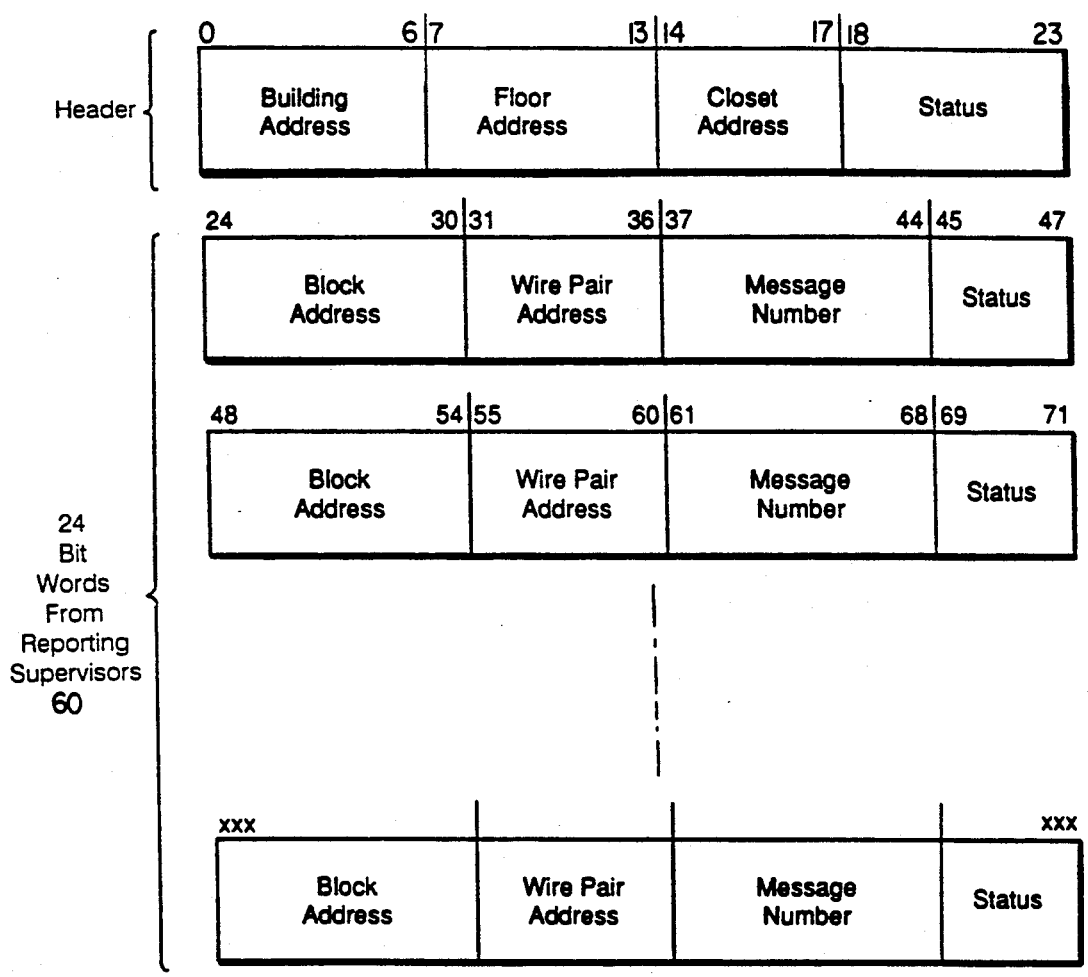

Referring to FIG. 12, because all supervisors 60 have been powered up and placed in a listen (documentation) mode, the wire pairs that receive a message number will report the message number that it heard along with all the other block information (FIG. 11) as a 24 bit word to its CIU 46. CIU 46 collects all of the 24 bit words from its reporting supervisors 60 in its memory 51 (FIG. 4). Then, CIU 46 forwards the 24 bit words to the computer system via the LAN with a 24 bit header word. The header word identifies the building, floor, and closet addresses, and includes 6 bits of status.

Computer 34 creates the wiring lists using the message number as the criterion for to/from charts. Computer 34 is thus able to instigate 256 simultaneous documentation transactions per LAN 48 leg.

Other embodiments are within the following claims.

For example, a lightning protector may also be added to the punch down blocks (and disposed in housing 61) to filter out voltage spikes and other possibly damaging power surges.

Also, a test module may be added to supervisor 60. This module will test for signal distortion, power level in dBs and voltage levels on any wire pair. When the test module is activated, on-line testing can be accomplished to facilitate problem isolation and troubleshooting. This module will automate the test procedures that will reduce the mean time to repair a problem.

Referring to FIG. 13, supervisor 60 (FIG. 2) can alternatively be connected to a punch down block 100 (such as the 66M punch down block described above) from behind the punch down block. One advantage of such an arrangement is that the terminals 37 of the block are unobstructed and are thus easily accessed for cross-connection to other terminal blocks. The circuitry of supervisor 60 is mounted on a printed circuit board (PCB) 99 disposed in a plastic housing 102 for protection from physical damage. Housing 102 is secured to a plastic mounting frame 104 using a series of screws (not shown).

Mounting frame 104 is essentially a bracket that serves as a protective cage for housing 102 (and hence for supervisor 60). Frame 104 includes a base 106 that is attached by screws 107 to the wall 108 of the wiring closet 20, 24 or other suitable support. Punch down block 100 is supported on a set of six plastic spacers 110 that extend from base 106. At each of the four corners of mounting frame 104 a resilient plastic clip extends alongside of a plastic spacer 110 and engages a tab 114 on punch down block 100 to firmly hold block 100 in place against spacers 110. The length of frame 104, the number of spacers 110 and clips 112, and the distance between spacers 110 are selected so that frame 104 securely holds punch down block 100 in place against wall 108 without danger of instability or release during use.

Spacers 110 position the underside 103 of punch down block 100 approximately six inches away from base 106. The width of housing 102 is somewhat less than this spacing to allow the housing, and hence supervisor 60, to be easily removed for repair or replacement.

Referring also to FIG. 5, many of the electrical connections to punch down block 100, supervisor 60, and secondary LAN 48 are modular (note that FIG. 13 does not show the cross-connections between terminals 37 of punch down block 100 and the terminals of another punch down block, which are made by individual wires connected between the terminals of the two blocks). The riser cable (or drop cable) 120 that contains the wires for the individual terminals 37 of punch down block 100 is terminated in any suitable connector 122 (such as a female RJ-21 fifty pin connector available from American Telephone and Telegraph Co., AT&T) that plugs into a matching socket 124 on housing 102.

A one-to-one connection between these wires and the individual wires 132 that are connected to the terminals 37 of punch down block 100 is made by "jumping" (i.e., connecting) the pins of socket 124 to corresponding pins of another socket 126 on housing 102. Socket 126 receives a connector 128 at the end of a cable 130 that contains wires 132 from the fifty individual terminals 37 of punch down block 100. (Only a few of wires 132 are shown for clarity.) To promote proper connection between connectors 122, 128 and sockets 124, 126, the sockets are mechanically incompatible (e.g., socket 126 is a female connector designed to receive a male RJ-21 connector 128).

Within housing 102, the fifty pins of either socket 122 or socket 126 are also connected to transmit selector 66 and receive selector 70 of supervisor 60, as shown in FIG. 5. This arrangement allows supervisor 60 to be disconnected from riser cable 120 and punch down block 100 quickly and easily, simply by unplugging connectors 122 and 128. Note that punch down block 100 can be reconnected to riser cable 120 in the absence of supervisor 60 (i.e., supervisor 60 can be bypassed) by coupling connectors 122, 1289 together with a feed-through connector.

Punch down block 100 can be replaced without having to disturb the individual connections to the circuitry of supervisor 60 or riser cable 120. Of course, to fully disconnect punch down block from the telephone network, the individual cross-connections to any other terminal blocks must be removed from terminals 37.

Supervisor 60 is connected to a secondary LAN 48 by a pair of twisted pair cables that terminate in RJ-11 interfaces 49 (FIG. 8) that plug into housing 102. Token handling hardware 72 (FIG. 5) operates with secondary LAN 48 in the same manner as described above.

We claim:

1. A system for tracing a conductor connected between a terminal of one terminal block and a terminal of another terminal block within a network of conductors and terminal blocks, comprising
   a supervisor associated with each terminal block for imposing a trace signal selectively on any of the terminals of said block, and for detecting a trace signal appearing on any of said terminals, and
   a controller in communication with said supervisors for causing a selected said supervisor to impose a trace signal on one of the terminals of its associated terminal block, and for receiving from said supervisors a report of another terminal at which said trace signal appears.

2. The system of claim 1 further comprising an assembly for mounting at least one said terminal block and its associated supervisor adjacent to one another on a supporting member.

3. The system of claim 2 wherein said mounting assembly includes a bracket constructed to provide a cage disposed about said supervisor.

4. The system of claim 3 wherein said supervisor is disposed within a housing.

5. The system of claim 3 wherein said bracket is configured to position said terminal block a predetermined distance from said supporting member to allow said supervisor to be disposed therebetween.

6. The system of claim 5 wherein said bracket includes a plurality of spacers and a plurality of clips for releasably holding said terminal block against said spacers.

7. The system of claim 1 further comprising a connector assembly associated with at least one of said terminal blocks for allowing said terminal block to be connected to and disconnected from at least some of the conductors of said network without disconnecting said conductors from the terminals of said block.

8. The system of claim 1 wherein the supervisor associated with said terminal block is connected between at least some of the conductors of said network and the terminals of said terminal block, and further comprising a connector assembly for allowing said supervisor to be connected to and disconnected from said terminal block and said at least some of said conductors without disconnecting said conductors from the terminals of said block.

9. The system of claim 7 or 8 wherein said connector assembly includes
   a first connector for receiving at a set of points a plurality of said conductors of said network,
   a second connector for receiving at a set of points connections from the terminals of said terminal block, and
   circuitry for interconnecting the sets of points of said first connector and said second connector.

10. The system of claim 9 further comprising
    a network connector for said at least some of said conductors of said network, said network connector being adapted to be attached to and removed from said first connector, and
    a terminal block connector for said terminal connections, said terminal block connector being adapted to be attached to and removed from said second connector.

11. The system of claim 10 wherein said first connector and said second connector are mechanically incompatible.

12. The system of claim 1 wherein said controller broadcasts to said supervisors an inquiry that identifies one of said conductors in said network, each supervisor comprising
    circuitry for causing said supervisor determine whether a terminal of the terminal block with which said supervisor is associated is connected to said one conductor and, if so, imposing said trace signal on said terminal.

13. The system of claim 12 wherein each supervisor further comprises
    circuitry for causing said supervisor, in response to said inquiry, to monitor the terminals of the terminal block with which said supervisor is associated for appearance of said trace signal.

14. The system of claim 13 wherein each supervisor further includes
    circuitry for identifying each terminal of the terminal block with which said supervisor is associated at which said trace signal appears and designating each said terminal in said report.

15. The system of claim 14 further comprising a processor for causing said controller to make said inquiry and for responding to reports from said supervisors to generate a list of all terminals that are interconnected to said one conductor identified in said inquiry.

16. The system of claim 15 further comprising a data base associated with said processor for storing said list.

17. The system of claim 1 wherein said terminal block is a punch down block.

18. The system of claim 17 wherein said punch down block is a 66M punch down block.

19. The system of claim 1 wherein said network is a telephone system for transmission of voice and data messages between subscribers via said conductors.

20. A method for tracing a conductor connected between a terminal of one terminal block and a terminal of another terminal block within a network of conductors and terminal blocks, comprising
    providing a supervisor associated with each terminal block for imposing a trace signal selectively on any of the terminals of said block, and for detecting a trace signal appearing on any of said terminals,
    sending from a controller a command to said supervisors that causes a selected said supervisor to impose a trace signal on one of the terminals of its associated terminal block, and
    causing said supervisors to send to said controller a report of another terminal at which said trace signal appears.

21. The method of claim 20 further comprising mounting at least one said terminal block and its associated supervisor adjacent to one another on a supporting member.

22. The method of claim 21 further comprising mounting said supervisor on a bracket that provides a cage disposed about said supervisor.

23. The method of claim 22 further comprising disposing said supervisor within a housing.

24. The method of claim 22 further comprising positioning said terminal block a predetermined distance from said supporting member to allow said supervisor to be disposed therebetween.

25. The method of claim 24 further comprising releasably holding said terminal block against a plurality of supports of said bracket with a plurality of clips.

26. The method of claim 20 further comprising connecting said terminal block to at least some of said network of conductors in a manner that allows said terminal block to be disconnected therefrom without disconnecting said conductors from the terminals of said block.

27. The method of claim 20 further comprising connecting said supervisor between at least some of the connectors of the network and the terminals of its associated terminal block in a manner that allows said supervisor to be connected to and disconnected from said terminal block and from said at least some of said conductors without disconnecting said conductors from the terminals of said block.

28. The method of claim 20 further comprising
broadcasting from said controller to said supervisors an inquiry that identifies one of said conductors in said network, and
determining, at each supervisor, whether the terminal block with which said supervisor is associated includes a terminal that is connected to said one conductor and, if so, imposing said trace signal on said terminal.

29. The method of claim 28 further comprising causing each supervisor to monitor the terminals of the terminal block with which said supervisor is associated for appearance of said trace signal in response to said inquiry.

30. The method of claim 29 further comprising causing each supervisor to
identify each terminal of the terminal block with which said supervisor is associated at which said trace signal appears, and
designate each said terminal in said report.

31. The method of claim 30 further comprising generating a list of all terminals that are interconnected to said one conductor identified in said inquiry in response to reports from said supervisors.

32. The method of claim 31 further comprising storing said list in a data base.

33. A supervisor for use in a system for tracing conductors in a network of conductors connected among terminal blocks, comprising
a network connection port for connection to the terminals of one of said terminal blocks,
a communication port, and
control circuitry connected to said communication port and to said network connection port for:
receiving from said communication port a command that identifies a terminal of said network, and imposing a trace signal on the identified terminal; and
identifying a terminal at which a trace signal appears and sending a report of the identity of said terminal via the communication port.

34. The supervisor of claim 33 further comprising an assembly for mounting said terminal block and said supervisor adjacent to one another on a supporting member.

35. The supervisor of claim 34 wherein said mounting assembly includes a bracket constructed to provide a cage disposed about said supervisor.

36. The supervisor of claim 35 wherein said supervisor is disposed within a housing.

37. The supervisor of claim 35 wherein said bracket is configured to position said terminal block a predetermined distance from said supporting member to allow said supervisor to be disposed therebetween.

38. The supervisor of claim 37 wherein said bracket includes a plurality of clips for releasably holding said terminal block against a plurality of spacers.

39. The supervisor of claim 33 further comprising a connector assembly associated with said terminal block for allowing said terminal block to be connected to and disconnected from at least some of said network of conductors without disconnecting said conductors from the terminals of said block.

40. The supervisor of claim 33 wherein said supervisor is connected between at least some of said conductors of said network and the terminals of the terminal block, and further comprising a connector assembly for allowing said supervisor to be connected to and disconnected from said terminal block and said at least some of said conductors without disconnecting said conductors from the terminals of said block.

41. The supervisor of claim 39 or 40 wherein said connector assembly includes
a first connector for receiving at a set of points a plurality of said conductors of said network,
a second connector for receiving at a set of points connections from the terminals of said terminal block, and
circuitry for interconnecting the sets of points of said first connector and said second connector.

42. The supervisor of claim 41 further comprising
a network connector for said at least some of said conductors of said network, said network connector being adapted to be attached to and removed from said first connector, and
a terminal block connector for said terminal connections, said terminal block connector being adapted to be attached to and removed from said second connector.

43. The supervisor of claim 42 wherein said first connector and said second connector are mechanically incompatible.

44. The supervisor of claim 33 further comprising circuitry for causing said supervisor determine whether said terminal block includes said terminal identified in said command and, if so, imposing said trace signal on said one terminal.

45. The supervisor of claim 44 further comprising circuitry for causing said supervisor, in response to said command, to monitor the terminals of said terminal block for appearance of said trace signal.

46. The supervisor of claim 45 further including circuitry for identifying each terminal of said terminal block at which said trace signal appears and designating each said terminal in said report.

* * * * *